US012588670B2

(12) United States Patent
Wang et al.

(10) Patent No.: US 12,588,670 B2
(45) Date of Patent: Mar. 31, 2026

(54) AUTOMATIC OBSTACLE AVOIDANCE METHOD AND SYSTEM OF PESTICIDE APPLICATION ROBOT AND STORAGE MEDIUM

(71) Applicant: Tobacco Research Institute of CAAS, Qingdao City (CN)

(72) Inventors: Xiuguo Wang, Qingdao City (CN); Zhongfeng Zhang, Qingdao City (CN); Guangwei Ren, Qingdao City (CN); Xiao Zheng, Qingdao City (CN); Wenjing Mu, Qingdao City (CN); Tong Liu, Qingdao City (CN)

(73) Assignee: Tobacco Research Institute of CAAS, Qingdao City (CN)

( * ) Notice: Subject to any disclaimer, the term of this patent is extended or adjusted under 35 U.S.C. 154(b) by 275 days.

(21) Appl. No.: 18/465,685

(22) Filed: Sep. 12, 2023

(65) Prior Publication Data

US 2025/0081958 A1     Mar. 13, 2025

(51) Int. Cl.
*A01M 7/00*        (2006.01)
*G05D 1/00*        (2024.01)
(52) U.S. Cl.
CPC ......... *A01M 7/0089* (2013.01); *G05D 1/0214* (2013.01); *G05D 1/0246* (2013.01); *G05D 1/0274* (2013.01)
(58) Field of Classification Search
CPC . A01M 7/0089; G05D 1/0214; G05D 1/0246; G05D 1/0274; G05D 1/2464; G05D 1/622; G05D 1/644; G05D 1/648; G05D 1/693; G05D 2107/21; G01C 21/20

USPC ......... 701/23, 25, 533, 28, 532, 26, 408, 50, 701/301, 300, 2, 468, 410, 469, 1, 409, 701/400, 24, 431, 467, 117, 411, 491, 701/454, 428, 472, 420, 423, 426, 450, 701/461, 412
See application file for complete search history.

(56) References Cited

U.S. PATENT DOCUMENTS

| | | | |
|---|---|---|---|
| 2018/0084708 A1* | 3/2018 | Neitemeier | A01B 69/001 |
| 2019/0172580 A1* | 6/2019 | Boroczky | A61B 5/0035 |
| 2019/0286145 A1* | 9/2019 | LaFary | G05D 1/0255 |
| 2020/0340826 A1* | 10/2020 | Li | G01C 21/383 |
| 2021/0259170 A1* | 8/2021 | Marder-Eppstein | A01G 27/001 |

(Continued)

*Primary Examiner* — Anne Marie Antonucci
*Assistant Examiner* — Jodi Jones
(74) *Attorney, Agent, or Firm* — Ballard Spahr LLP

(57) ABSTRACT

Provided are an automatic obstacle avoidance method and system of a pesticide application robot and a storage medium. The method includes: acquiring a plan view of a target pesticide application operation area and acquiring path information; acquiring start point information and end point information of a pesticide application robot and environmental information of the target pesticide application operation area, performing preliminary path planning, and acquiring an optimal path; causing the pesticide application robot to arrive at a specified operating point along the optimal path, and performing environmental perception by machine vision, determining obstacle point information and updating the plan view of the target pesticide application operation area with the obstacle point information; and correcting the optimal path with a current location of the pesticide application robot and an area to which a pesticide has been sprayed based on the updated plan view of the target pesticide application operation area.

12 Claims, 4 Drawing Sheets

(56)                    References Cited

U.S. PATENT DOCUMENTS

2022/0091615 A1*  3/2022  Ord ....................... A47L 9/2852
2022/0163969 A1*  5/2022  Li  .................... G08G 1/096811
2024/0071094 A1*  2/2024  Zhu ..................... G06V 10/751
2024/0192702 A1*  6/2024  Sun ..................... G05D 1/2464

* cited by examiner

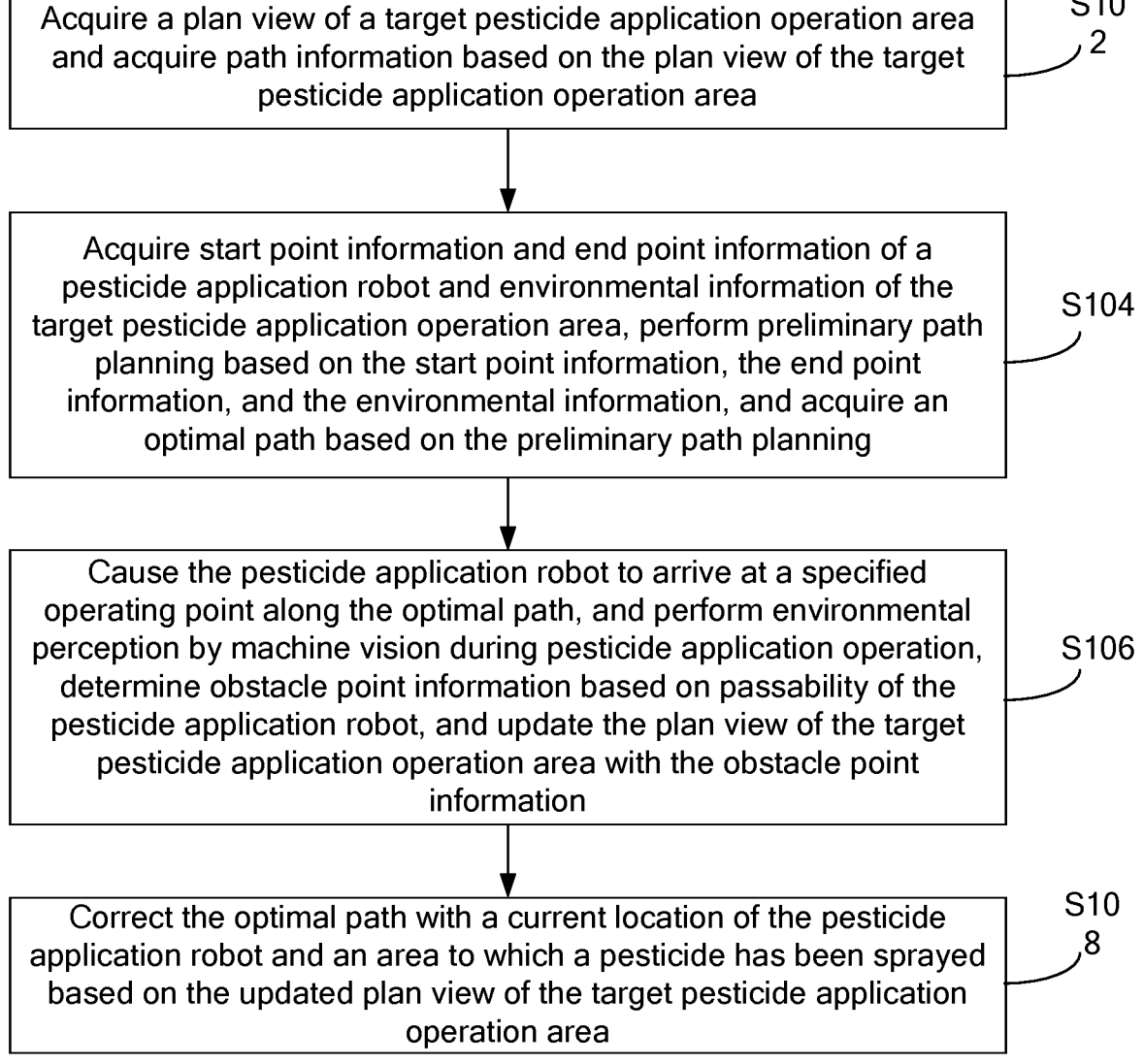

| Acquire a plan view of a target pesticide application operation area and acquire path information based on the plan view of the target pesticide application operation area | S10 2 |

| Acquire start point information and end point information of a pesticide application robot and environmental information of the target pesticide application operation area, perform preliminary path planning based on the start point information, the end point information, and the environmental information, and acquire an optimal path based on the preliminary path planning | S104 |

| Cause the pesticide application robot to arrive at a specified operating point along the optimal path, and perform environmental perception by machine vision during pesticide application operation, determine obstacle point information based on passability of the pesticide application robot, and update the plan view of the target pesticide application operation area with the obstacle point information | S106 |

| Correct the optimal path with a current location of the pesticide application robot and an area to which a pesticide has been sprayed based on the updated plan view of the target pesticide application operation area | S10 8 |

FIG. 1

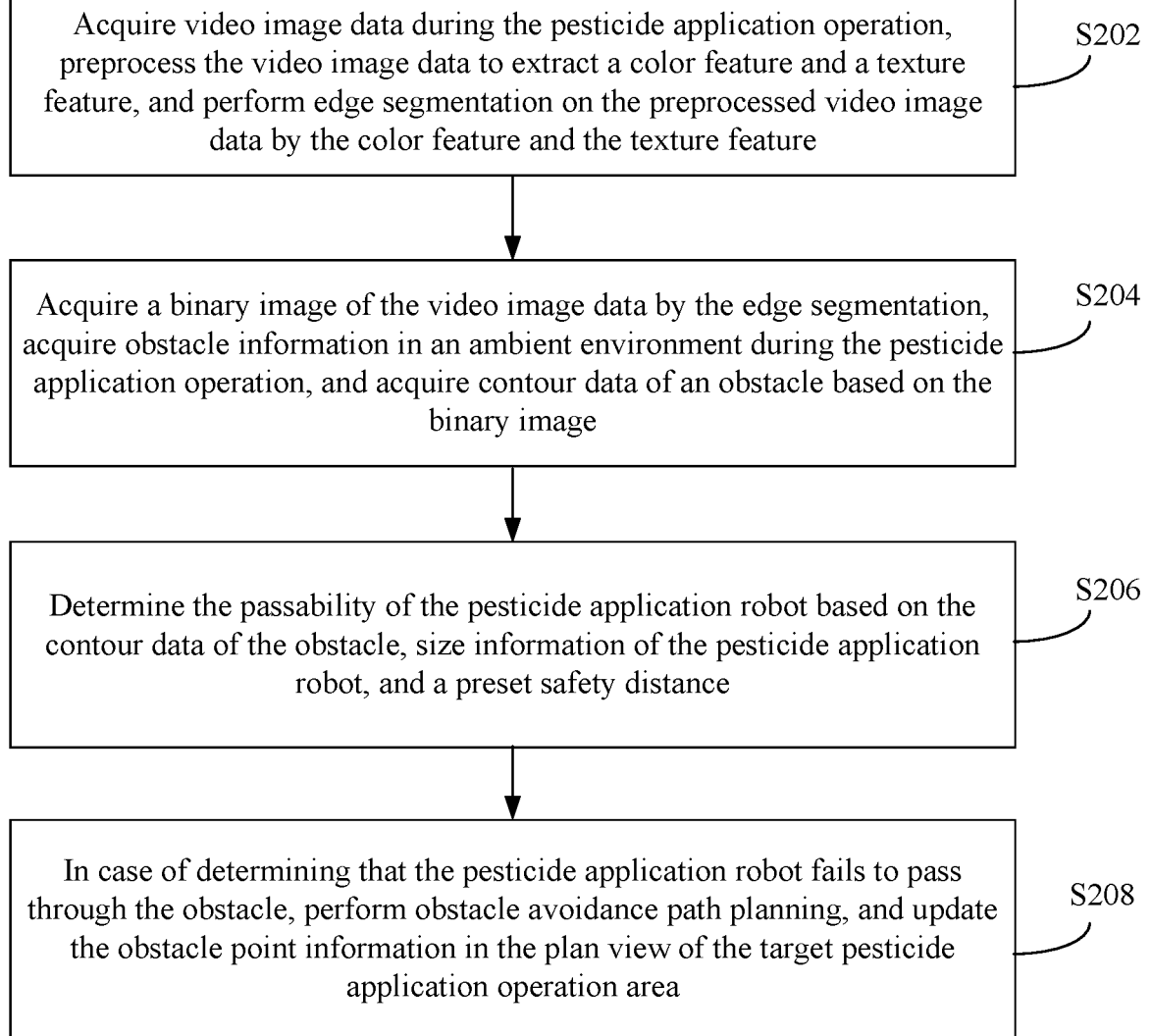

Acquire video image data during the pesticide application operation, preprocess the video image data to extract a color feature and a texture feature, and perform edge segmentation on the preprocessed video image data by the color feature and the texture feature

S202

Acquire a binary image of the video image data by the edge segmentation, acquire obstacle information in an ambient environment during the pesticide application operation, and acquire contour data of an obstacle based on the binary image

S204

Determine the passability of the pesticide application robot based on the contour data of the obstacle, size information of the pesticide application robot, and a preset safety distance

S206

In case of determining that the pesticide application robot fails to pass through the obstacle, perform obstacle avoidance path planning, and update the obstacle point information in the plan view of the target pesticide application operation area

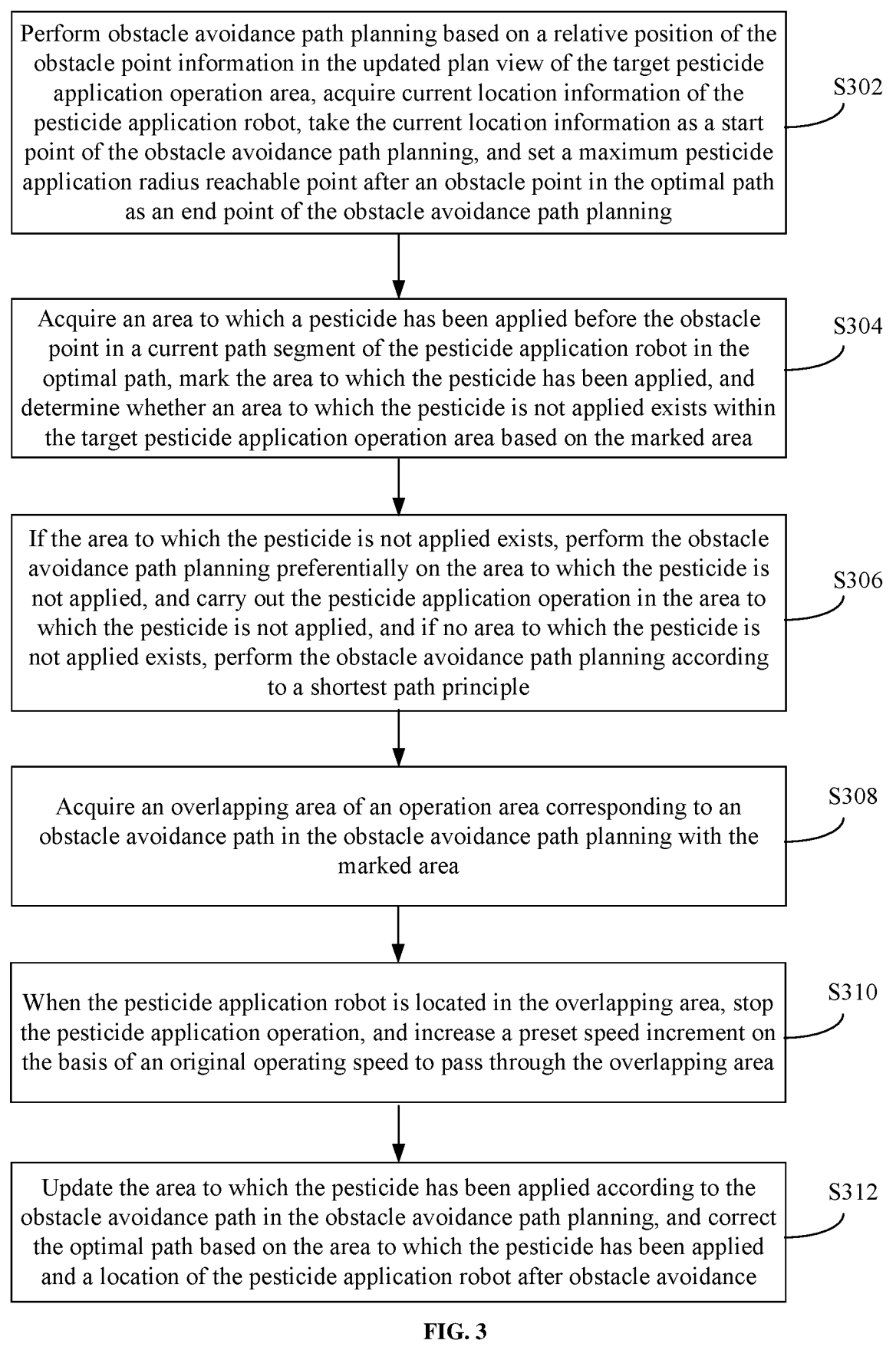

Perform obstacle avoidance path planning based on a relative position of the obstacle point information in the updated plan view of the target pesticide application operation area, acquire current location information of the pesticide application robot, take the current location information as a start point of the obstacle avoidance path planning, and set a maximum pesticide application radius reachable point after an obstacle point in the optimal path as an end point of the obstacle avoidance path planning — S302

Acquire an area to which a pesticide has been applied before the obstacle point in a current path segment of the pesticide application robot in the optimal path, mark the area to which the pesticide has been applied, and determine whether an area to which the pesticide is not applied exists within the target pesticide application operation area based on the marked area — S304

If the area to which the pesticide is not applied exists, perform the obstacle avoidance path planning preferentially on the area to which the pesticide is not applied, and carry out the pesticide application operation in the area to which the pesticide is not applied, and if no area to which the pesticide is not applied exists, perform the obstacle avoidance path planning according to a shortest path principle — S306

Acquire an overlapping area of an operation area corresponding to an obstacle avoidance path in the obstacle avoidance path planning with the marked area — S308

When the pesticide application robot is located in the overlapping area, stop the pesticide application operation, and increase a preset speed increment on the basis of an original operating speed to pass through the overlapping area — S310

Update the area to which the pesticide has been applied according to the obstacle avoidance path in the obstacle avoidance path planning, and correct the optimal path based on the area to which the pesticide has been applied and a location of the pesticide application robot after obstacle avoidance — S312

FIG. 3

Memory 41

Processor 42

Automatic obstacle avoidance
system of pesticide application
robot 4

FIG. 4

AUTOMATIC OBSTACLE AVOIDANCE METHOD AND SYSTEM OF PESTICIDE APPLICATION ROBOT AND STORAGE MEDIUM

TECHNICAL FIELD

The present disclosure relates to the technical field of artificial intelligent, and more particularly, to an automatic obstacle avoidance method and system of a pesticide application robot and a storage medium.

BACKGROUND

Pesticide spraying is an effective means to control plant diseases, insect pests, and weeds in agricultural production. The traditional manual pesticide application manner is low in pesticide utilization rate. A pesticide sedimented into soil may cause environmental pollution, and a pesticide volatilizing into air may be hazardous to the human health. Therefore, it is especially important to adopt unmanned pesticide application operation in facility production. A pesticide application robot is one of important implementation means for unmanned pesticide application operation. During plant protection operation, reasons such as a great height of some plants at the middle and later stage, a narrow row spacing, and a high clearance may make the operation hard, and most existing pesticide application robots are not ideal in obstacle avoidance effect and low in autonomy and can achieve the purpose of obstacle avoidance only with human assistance, resulting in reduced pesticide application efficiency.

To achieve automatic obstacle avoidance of a pesticide application robot and realize accurate pesticide application under complex topographic conditions, real-time path planning of the pesticide application robot is required. The path planning of the pesticide application robot refers to autonomously avoiding obstacles from a current location to move to a target location without collision along a shortest path. Existing common obstacle avoidance methods mainly rely on perception to obstacles by ultrasonic sensors or infrared sensors to realize obstacle avoidance, and have the problems of a small number of sensors, a single obstacle avoidance scheme, and low efficiency. Meanwhile, a map prestored in a pesticide application robot is not a real-time map, and the map can be hardly acquired in real time or updated.

SUMMARY

To solve the above-mentioned technical problems, the present disclosure provides an automatic obstacle avoidance method and system of a pesticide application robot and a storage medium.

A first aspect of the present disclosure provides an automatic obstacle avoidance method of a pesticide application robot, including:

acquiring a plan view of a target pesticide application operation area and acquiring path information based on the plan view of the target pesticide application operation area;

acquiring start point information and end point information of a pesticide application robot and environmental information of the target pesticide application operation area, performing preliminary path planning based on the start point information, the end point information, and the environmental information, and acquiring an optimal path based on the preliminary path planning;

causing the pesticide application robot to arrive at a specified operating point along the optimal path, and performing environmental perception by machine vision during pesticide application operation, determining obstacle point information based on passability of the pesticide application robot, and updating the plan view of the target pesticide application operation area with the obstacle point information; and correcting the optimal path with a current location of the pesticide application robot and an area to which a pesticide has been sprayed based on the updated plan view of the target pesticide application operation area.

In the present disclosure, the acquiring start point information and end point information of a pesticide application robot and environmental information of the target pesticide application operation area and performing preliminary path planning based on the start point information, the end point information, and the environmental information may specifically include:

establishing a raster map of the target pesticide application operation area based on the plan view of the target pesticide application operation area and the environmental information, and presetting a speed constraint and a steering constraint of the pesticide application robot and a maximum safe distance of the pesticide application robot to an obstacle;

performing the preliminary path planning with a D* algorithm and constraint information based on start point information and end point information on the raster map, and setting a priority queue based on the end point information to perform backward searching in the raster map;

when an obstacle node is detected during searching, correcting path costs of neighboring raster nodes, and placing the neighboring raster nodes into the priority queue again until the current location of the pesticide application robot comes out of the priority queue; and selecting from the neighboring raster nodes a node having a minimum path cost for connection to the start point information and then performing the preliminary path planning to generate an optimal path.

In the present disclosure, the performing environmental perception by machine vision during pesticide application operation, determining obstacle point information based on passability of the pesticide application robot, and updating the plan view of the target pesticide application operation area with the obstacle point information may specifically include:

acquiring video image data during the pesticide application operation, preprocessing the video image data to extract a color feature and a texture feature, and performing edge segmentation on the preprocessed video image data by the color feature and the texture feature;

acquiring a binary image of the video image data by the edge segmentation, acquiring obstacle information in an ambient environment during the pesticide application operation, and acquiring contour data of an obstacle based on the binary image;

determining the passability of the pesticide application robot based on the contour data of the obstacle, size information of the pesticide application robot, and a preset safety distance; and in case of determining that the pesticide application robot fails to pass through the obstacle, performing obstacle avoidance path planning, and updating the obstacle point information in the plan view of the target pesticide application operation area.

In the present disclosure, the determining the passability of the pesticide application robot based on the contour data of the obstacle, size information of the pesticide application robot, and a preset safety distance may specifically include:

acquiring a size parameter of the obstacle based on the contour data of the obstacle, and comparing the size parameter of the obstacle with a maximum width or a maximum ground clearance of the pesticide application robot;

when the size parameter of the obstacle is greater than the maximum width or the maximum ground clearance, determining that the obstacle is impassable; and when the obstacle is passable, determining a tilting probability of the pesticide application robot, and when an inclination angle of a body of the pesticide application robot is determined to be greater than a preset inclination angle, indicating that the pesticide application robot is prone to tilting and determining that the obstacle is impassable.

In the present disclosure, the correcting the optimal path with a current location of the pesticide application robot and an area to which a pesticide has been sprayed based on the updated plan view of the target pesticide application operation area may specifically include:

performing obstacle avoidance path planning based on a relative position of the obstacle point information in the updated plan view of the target pesticide application operation area, acquiring current location information of the pesticide application robot, taking the current location information as a start point of the obstacle avoidance path planning, and setting a maximum pesticide application radius reachable point after an obstacle point in the optimal path as an end point of the obstacle avoidance path planning;

acquiring an area to which a pesticide has been applied before the obstacle point in a current path segment of the pesticide application robot in the optimal path, marking the area to which the pesticide has been applied, and determining whether an area to which the pesticide is not applied exists within the target pesticide application operation area based on the marked area;

if the area to which the pesticide is not applied exists, performing the obstacle avoidance path planning preferentially on the area to which the pesticide is not applied, and carrying out the pesticide application operation in the area to which the pesticide is not applied, and if no area to which the pesticide is not applied exists, performing the obstacle avoidance path planning according to a shortest path principle;

acquiring an overlapping area of an operation area corresponding to an obstacle avoidance path in the obstacle avoidance path planning with the marked area;

when the pesticide application robot is located in the overlapping area, stopping the pesticide application operation, and increasing a preset speed increment on the basis of an original operating speed to pass through the overlapping area; and updating the area to which the pesticide has been applied according to the obstacle avoidance path in the obstacle avoidance path planning, and correcting the optimal path based on the area to which the pesticide has been applied and a location of the pesticide application robot after obstacle avoidance.

In the present disclosure, the automatic obstacle avoidance method of a pesticide application robot may further include:

when a plurality of pesticide application robots are present in the target pesticide application operation area, displaying optimal paths and real-time location information of the plurality of pesticide application robots in the plan view of the target pesticide application operation area;

determining whether collision occurs or whether pesticide application operation areas overlap according to the optimal paths based on current location information and motion speed information of the plurality of pesticide application robots;

when detecting that a current pesticide application robot is to collide with a target pesticide application robot, setting a waiting time of the current pesticide application robot based on size information and motion speed information of the target pesticide application robot, and causing the current pesticide application robot to wait in situ for the waiting time until the target pesticide application robot passes;

if the target pesticide application robot has no certain motion trajectory, performing the obstacle avoidance path planning with a possible motion area for the target pesticide application robot at next point of time as an obstacle area, the current location of the current pesticide application robot as a planning start point, and a nearest point in the optimal path of the current pesticide application robot after the obstacle area as an obstacle avoidance end point; and when operation areas of the plurality of pesticide application robots have an overlapping area, taking the overlapping area as the obstacle area for any pesticide application robot and performing secondary planning on the optimal path thereof in combination with the current location information thereof.

A second aspect of the present disclosure further provides an automatic obstacle avoidance system of a pesticide application robot, including a memory and a processor, where the memory includes an automatic obstacle avoidance method program of a pesticide application robot, and the automatic obstacle avoidance method program of a pesticide application robot, when executed by the processor, performs the following steps:

acquiring a plan view of a target pesticide application operation area and acquiring path information based on the plan view of the target pesticide application operation area;

acquiring start point information and end point information of a pesticide application robot and environmental information of the target pesticide application operation area, performing preliminary path planning based on the start point information, the end point information, and the environmental information, and acquiring an optimal path based on the preliminary path planning;

causing the pesticide application robot to arrive at a specified operating point along the optimal path, and performing environmental perception by machine vision during pesticide application operation, determining obstacle point information based on passability of the pesticide application robot, and updating the plan view of the target pesticide application operation area with the obstacle point information; and correcting the optimal path with a current location of the pesticide application robot and an area to which a pesticide has been sprayed based on the updated plan view of the target pesticide application operation area.

In the present disclosure, the acquiring start point information and end point information of a pesticide application robot and environmental information of the target pesticide application operation area and performing preliminary path planning based on the start point information, the end point information, and the environmental information may specifically include:

establishing a raster map of the target pesticide application operation area based on the plan view of the target pesticide application operation area and the environmental information, and presetting a speed constraint and a steering constraint of the pesticide application robot and a maximum safe distance of the pesticide application robot to an obstacle;

performing the preliminary path planning with a D* algorithm and constraint information based on start point information and end point information on the raster map, and setting a priority queue based on the end point information to perform backward searching in the raster map;

when an obstacle node is detected during searching, correcting path costs of neighboring raster nodes, and placing the neighboring raster nodes into the priority queue again until the current location of the pesticide application robot comes out of the priority queue; and selecting from the neighboring raster nodes a node having a minimum path cost for connection to the start point information and then performing the preliminary path planning to generate an optimal path.

In the present disclosure, the correcting the optimal path with a current location of the pesticide application robot and an area to which a pesticide has been sprayed based on the updated plan view of the target pesticide application operation area may specifically include:

performing obstacle avoidance path planning based on a relative position of the obstacle point information in the updated plan view of the target pesticide application operation area, acquiring current location information of the pesticide application robot, taking the current location information as a start point of the obstacle avoidance path planning, and setting a maximum pesticide application radius reachable point after an obstacle point in the optimal path as an end point of the obstacle avoidance path planning;

acquiring an area to which a pesticide has been applied before the obstacle point in a current path segment of the pesticide application robot in the optimal path, marking the area to which the pesticide has been applied, and determining whether an area to which the pesticide is not applied exists within the target pesticide application operation area based on the marked area;

if the area to which the pesticide is not applied exists, performing the obstacle avoidance path planning preferentially on the area to which the pesticide is not applied, and carrying out the pesticide application operation in the area to which the pesticide is not applied, and if no area to which the pesticide is not applied exists, performing the obstacle avoidance path planning according to a shortest path principle;

acquiring an overlapping area of an operation area corresponding to an obstacle avoidance path in the obstacle avoidance path planning with the marked area;

when the pesticide application robot is located in the overlapping area, stopping the pesticide application operation, and increasing a preset speed increment on the basis of an original operating speed to pass through the overlapping area; and updating the area to which the pesticide has been applied according to the obstacle avoidance path in the obstacle avoidance path planning, and correcting the optimal path based on the area to which the pesticide has been applied and a location of the pesticide application robot after obstacle avoidance.

A third aspect of the present disclosure further provides a computer-readable storage medium, including an automatic obstacle avoidance method program of a pesticide application robot, where the automatic obstacle avoidance method program of a pesticide application robot, when executed by the processor, performs the steps of the automatic obstacle avoidance method of a pesticide application robot as described above.

The present disclosure provides an automatic obstacle avoidance method and system of a pesticide application robot and a storage medium. The automatic obstacle avoidance method of a pesticide application robot includes: acquiring a plan view of a target pesticide application operation area; acquiring start point information and end point information of a pesticide application robot and environmental information of the target pesticide application operation area, performing preliminary path planning, and generating an optimal path; causing the pesticide application robot to arrive at a specified operating point along the optimal path, and performing environmental perception by machine vision during pesticide application operation, determining obstacle point information based on passability of the pesticide application robot, and updating the plan view of the target pesticide application operation area with the obstacle point information; and correcting the optimal path with a current location of the pesticide application robot and an area to which a pesticide has been sprayed based on the updated plan view of the target pesticide application operation area. The present disclosure realizes automatic obstacle avoidance of a pesticide application robot through real-time perception to an environment by machine vision and global path planning, and avoids repeated pesticide spraying by optimally setting an obstacle avoidance path of the pesticide application robot and improves the pesticide application efficiency.

BRIEF DESCRIPTION OF THE DRAWINGS

FIG. 1 illustrates a flowchart of an automatic obstacle avoidance method of a pesticide application robot according to the present disclosure;

FIG. 2 illustrates a flowchart of a method for determining obstacle point information based on passability of a pesticide application robot according to the present disclosure;

FIG. 3 illustrates a flowchart of a method for correcting an optimal path according to the present disclosure; and FIG. 4 illustrates a block diagram of an automatic obstacle avoidance system of a pesticide application robot according to the present disclosure.

DETAILED DESCRIPTION OF THE EMBODIMENTS

To make the objectives, features and advantages of the present disclosure more comprehensible, the present disclosure is further described in detail below with reference to the drawings and specific embodiments. It should be noted that the embodiments of the present disclosure and the features of the embodiments can be combined with one another to derive new embodiments without conflict.

In the following description, many specific details are set forth in order to facilitate full understanding of the present disclosure, but the present disclosure can also be implemented in other ways other than those described herein. Therefore, the present disclosure is not limited by the specific examples disclosed below.

FIG. 1 illustrates a flowchart of an automatic obstacle avoidance method of a pesticide application robot according to the present disclosure.

As shown in FIG. 1, the first aspect of the present disclosure provides an automatic obstacle avoidance method of a pesticide application robot, including:

S102, acquire a plan view of a target pesticide application operation area and acquire path information based on the plan view of the target pesticide application operation area;

S104, acquire start point information and end point information of a pesticide application robot and environmental information of the target pesticide application operation area, perform preliminary path planning based on the start point information, the end point information, and the environmental information, and acquire an optimal path based on the preliminary path planning;

S106, cause the pesticide application robot to arrive at a specified operating point along the optimal path, and perform environmental perception by machine vision during pesticide application operation, determine obstacle point information based on passability of the pesticide application robot, and update the plan view of the target pesticide application operation area with the obstacle point information; and S108, correct the optimal path with a current location of the pesticide application robot and an area to which a pesticide has been sprayed based on the updated plan view of the target pesticide application operation area.

It needs to be noted that the acquiring start point information and end point information of a pesticide application robot and environmental information of the target pesticide application operation area and performing preliminary path planning based on the start point information, the end point information, and the environmental information are specifically as follows: a raster map of the target pesticide application operation area is established based on the plan view of the target pesticide application operation area and the environmental information, and a speed constraint and a steering constraint of the pesticide application robot and a maximum safe distance of the pesticide application robot to an obstacle are preset. The environmental information includes fixed obstacle information of the target pesticide application operation area, existing path information, and the like. The preliminary path planning is performed with a D* algorithm and constraint information based on start point information and end point information on the raster map, and a priority queue is set based on the end point information to perform backward searching in the raster map. At the beginning, all raster nodes are set to New, where New represents that a raster node has never been placed in the priority queue. A cost estimate of an end point is set to 0. A raster node having a minimum value of K is continuously picked out of the current priority queue, where a value of K is a ranking basis. Whenever a raster node is moved out of the priority queue, the raster node may transfer a cost to neighborhood raster nodes thereof, and these neighborhood raster nodes may be placed into the priority queue. An optimal path of each raster node to the end point is calculated continuously until the current location of the pesticide application robot comes out of the priority queue. The optimal path is generated by pointing from the current raster node of the pesticide application robot to the end point with a pointer pointing to a previous raster node. When an obstacle node is detected during searching, path costs of neighboring raster nodes are corrected, and the neighboring raster nodes are placed into the priority queue again. A node having a minimum path cost is selected from the neighboring raster nodes and connected to the start point information and then the preliminary path planning is performed to generate an optimal path.

FIG. 2 illustrates a flowchart of a method for determining obstacle point information based on passability of a pesticide application robot according to the present disclosure.

According to the technical solution of the present disclosure, the performing environmental perception by machine vision during pesticide application operation, determining obstacle point information based on passability of the pesticide application robot, and updating the plan view of the target pesticide application operation area with the obstacle point information specifically include:

S202, acquire video image data during the pesticide application operation, preprocess the video image data to extract a color feature and a texture feature, and perform edge segmentation on the preprocessed video image data by the color feature and the texture feature;

S204, acquire a binary image of the video image data by the edge segmentation, acquire obstacle information in an ambient environment during the pesticide application operation, and acquire contour data of an obstacle based on the binary image;

S206, determine the passability of the pesticide application robot based on the contour data of the obstacle, size information of the pesticide application robot, and a preset safety distance; and S208, in case of determining that the pesticide application robot fails to pass through the obstacle, perform obstacle avoidance path planning, and update the obstacle point information in the plan view of the target pesticide application operation area.

It needs to be noted that in acquiring an environmental image by a machine vision device is often affected by noise. Therefore, the video image data is subjected to filtering and noise reduction. The video image data is transformed to a red-green-blue (RGB) space for processing to acquire a color feature, and an obstacle is identified and distinguished based on a difference of a color space. Moreover, the video image data is subjected to graying processing. An edge of an environmental object is extracted utilizing a Canny edge detection operator to generate a texture feature. A binary image is obtained by identification based on the color feature and the texture feature. An impurity point is removed from the binary image, and the obstacle is calibrated. Preferably, the obstacle may be identified and distinguished by machine learning methods such as a neural network. The obstacle avoidance path planning may be implemented by methods such as a genetic algorithm, an ant colony optimization, a rapidly-exploring random tree (RRT) algorithm, and a dynamic window.

It needs to be noted that the determining the passability of the pesticide application robot based on the contour data of the obstacle, size information of the pesticide application robot, and a preset safety distance specifically includes: acquire a size parameter of the obstacle based on the contour data of the obstacle, and compare the size parameter of the obstacle with a maximum width or a maximum ground clearance of the pesticide application robot; when the size parameter of the obstacle is greater than the maximum width or the maximum ground clearance, determine that the obstacle is impassable; and when the obstacle is passable, determine a tilting probability of the pesticide application robot, and when an inclination angle of a body of the pesticide application robot is determined to be greater than a preset inclination angle, indicate that the pesticide application robot is prone to tilting and determine that the obstacle is impassable. In addition, the pesticide application robot has a turning width during steering, and when considering whether the pesticide application robot is capable of passing through an obstacle, a comparison between the turning width and a size of the obstacle needs to be considered.

FIG. 3 illustrates a flowchart of a method for correcting an optimal path according to the present disclosure.

According to embodiments of the present disclosure, the correcting the optimal path with a current location of the pesticide application robot and an area to which a pesticide has been sprayed based on the updated plan view of the target pesticide application operation area specifically includes:

S302, perform obstacle avoidance path planning based on a relative position of the obstacle point information in the updated plan view of the target pesticide application operation area, acquire current location information of the pesticide application robot, take the current location information as a start point of the obstacle avoidance path planning, and set a maximum pesticide application radius reachable point after an obstacle point in the optimal path as an end point of the obstacle avoidance path planning;

S304, acquire an area to which a pesticide has been applied before the obstacle point in a current path segment of the pesticide application robot in the optimal path, mark the area to which the pesticide has been applied, and determine whether an area to which the pesticide is not applied exists within the target pesticide application operation area based on the marked area;

S306, if the area to which the pesticide is not applied exists, perform the obstacle avoidance path planning preferentially on the area to which the pesticide is not applied, and carry out the pesticide application operation in the area to which the pesticide is not applied, and if no area to which the pesticide is not applied exists, perform the obstacle avoidance path planning according to a shortest path principle;

S308, acquire an overlapping area of an operation area corresponding to an obstacle avoidance path in the obstacle avoidance path planning with the marked area;

S310, when the pesticide application robot is located in the overlapping area, stop the pesticide application operation, and increase a preset speed increment on the basis of an original operating speed to pass through the overlapping area; and S312, update the area to which the pesticide has been applied according to the obstacle avoidance path in the obstacle avoidance path planning, and correct the optimal path based on the area to which the pesticide has been applied and a location of the pesticide application robot after obstacle avoidance.

It needs to be noted that the automatic obstacle avoidance method further includes: when a plurality of pesticide application robots are present in the target pesticide application operation area, display optimal paths and real-time location information of the plurality of pesticide application robots in the plan view of the target pesticide application operation area; determine whether collision occurs or whether pesticide application operation areas overlap according to the optimal paths based on current location information and motion speed information of the plurality of pesticide application robots; when detecting that a current pesticide application robot is to collide with a target pesticide application robot, set a waiting time of the current pesticide application robot based on size information and motion speed information of the target pesticide application robot, and cause the current pesticide application robot to wait in situ for the waiting time until the target pesticide application robot passes; if the target pesticide application robot has no certain motion trajectory, perform the obstacle avoidance path planning with a possible motion area for the target pesticide application robot at next point of time as an obstacle area, the current location of the current pesticide application robot as a planning start point, and a nearest point in the optimal path of the current pesticide application robot after the obstacle area as an obstacle avoidance end point; and when operation areas of the plurality of pesticide application robots have an overlapping area, take the overlapping area as the obstacle area for any pesticide application robot and perform secondary planning on the optimal path thereof in combination with the current location information thereof.

Figure 4:
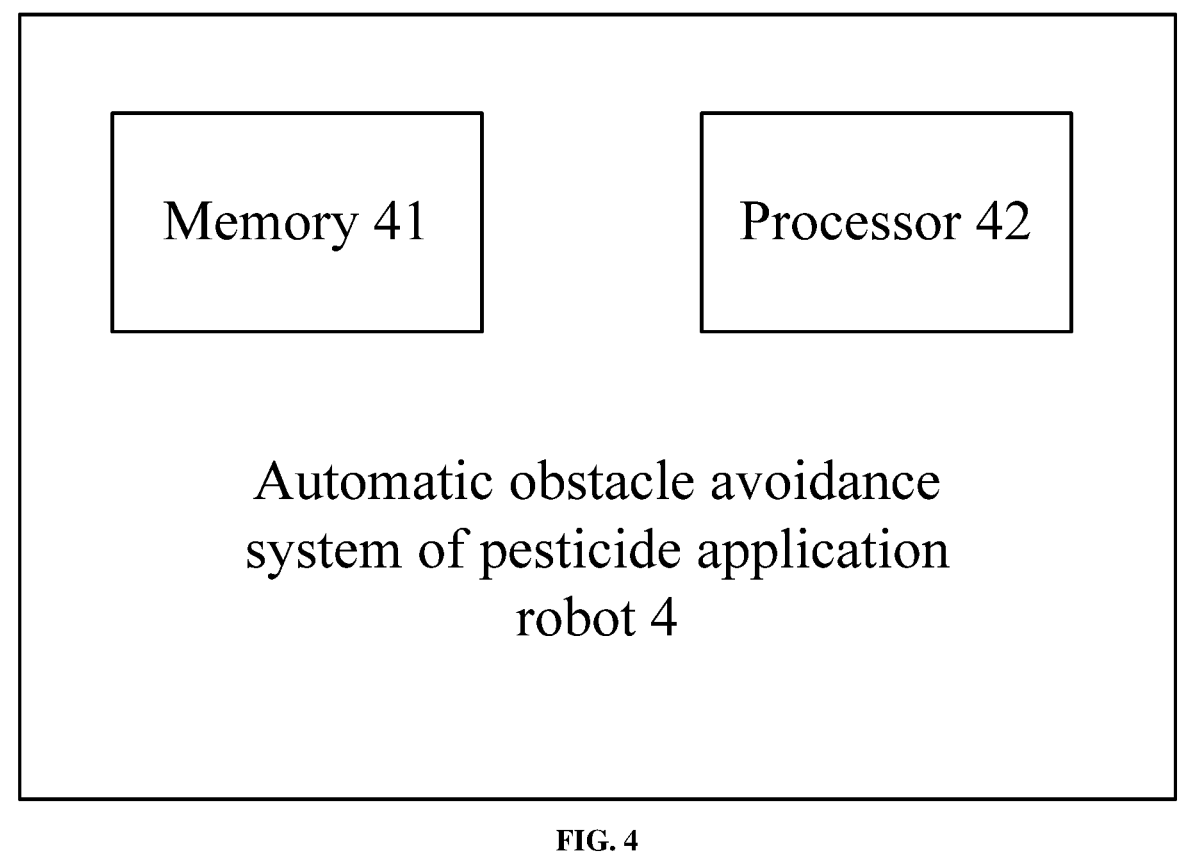

FIG. 4 illustrates a block diagram of an automatic obstacle avoidance system of a pesticide application robot according to the present disclosure.

The second aspect of the present disclosure further provides an automatic obstacle avoidance system 4 of a pesticide application robot, including a memory 41 and a processor 42, where the memory includes an automatic obstacle avoidance method program of a pesticide application robot, and the automatic obstacle avoidance method program of a pesticide application robot, when executed by the processor, performs the following steps:

acquire a plan view of a target pesticide application operation area and acquire path information based on the plan view of the target pesticide application operation area;

acquire start point information and end point information of a pesticide application robot and environmental information of the target pesticide application operation area, perform preliminary path planning based on the start point information, the end point information, and the environmental information, and acquire an optimal path based on the preliminary path planning;

cause the pesticide application robot to arrive at a specified operating point along the optimal path, and perform environmental perception by machine vision during pesticide application operation, determine obstacle point information based on passability of the pesticide application robot, and update the plan view of the target pesticide application operation area with the obstacle point information; and correct the optimal path with a current location of the pesticide application robot and an area to which a pesticide has been sprayed based on the updated plan view of the target pesticide application operation area.

It needs to be noted that the acquiring start point information and end point information of a pesticide application robot and environmental information of the target pesticide application operation area and performing preliminary path planning based on the start point information, the end point information, and the environmental information are specifically as follows: a raster map of the target pesticide application operation area is established based on the plan view of the target pesticide application operation area and the environmental information, and a speed constraint and a steering constraint of the pesticide application robot and a maximum safe distance of the pesticide application robot to an obstacle are preset. The environmental information includes fixed obstacle information of the target pesticide application operation area, existing path information, and the like. The preliminary path planning is performed with a D* algorithm and constraint information based on start point information and end point information on the raster map, and a priority queue is set based on the end point information to perform backward searching in the raster map. At the beginning, all raster nodes are set to New, where New represents that a raster node has never been placed in the priority queue. A cost estimate of an end point is set to 0. A raster node having a minimum value of K is continuously picked out of the current priority queue, where a value of K is a ranking basis. Whenever a raster node is moved out of the priority queue, the raster node may transfer a cost to neighborhood raster nodes thereof, and these neighborhood raster nodes may be placed into the priority queue. An optimal path of each raster node to the end point is calculated continuously until the current location of the pesticide application robot comes out of the priority queue. The optimal path is generated by pointing from the current raster node of the pesticide application robot to the end point with a pointer pointing to a previous raster node. When an obstacle node is detected during searching, path costs of neighboring raster nodes are corrected, and the neighboring raster nodes are placed into the priority queue again. A node having a minimum path cost is selected from the neighboring raster nodes and connected to the start point information and then the preliminary path planning is performed to generate an optimal path.

According to the technical solution of the present disclosure, the performing environmental perception by machine vision during pesticide application operation, determining obstacle point information based on passability of the pesticide application robot, and updating the plan view of the target pesticide application operation area with the obstacle point information specifically include:

acquiring video image data during the pesticide application operation, preprocessing the video image data to extract a color feature and a texture feature, and performing edge segmentation on the preprocessed video image data by the color feature and the texture feature;

acquiring a binary image of the video image data by the edge segmentation, acquiring obstacle information in an ambient environment during the pesticide application operation, and acquiring contour data of an obstacle based on the binary image;

determining the passability of the pesticide application robot based on the contour data of the obstacle, size information of the pesticide application robot, and a preset safety distance; and in case of determining that the pesticide application robot fails to pass through the obstacle, performing obstacle avoidance path planning, and updating the obstacle point information in the plan view of the target pesticide application operation area.

It needs to be noted that in acquiring an environmental image by a machine vision device is often affected by noise. Therefore, the video image data is subjected to filtering and noise reduction. The video image data is transformed to a red-green-blue (RGB) space for processing to acquire a color feature, and an obstacle is identified and distinguished based on a difference of a color space. Moreover, the video image data is subjected to graying processing. An edge of an environmental object is extracted utilizing a Canny edge detection operator to generate a texture feature. A binary image is obtained by identification based on the color feature and the texture feature. An impurity point is removed from the binary image, and the obstacle is calibrated. Preferably, the obstacle may be identified and distinguished by machine learning methods such as a neural network. The obstacle avoidance path planning may be implemented by methods such as a genetic algorithm, an ant colony optimization, a rapidly-exploring random tree (RRT) algorithm, and a dynamic window.

It needs to be noted that the determining the passability of the pesticide application robot based on the contour data of the obstacle, size information of the pesticide application robot, and a preset safety distance specifically includes: acquire a size parameter of the obstacle based on the contour data of the obstacle, and compare the size parameter of the obstacle with a maximum width or a maximum ground clearance of the pesticide application robot; when the size parameter of the obstacle is greater than the maximum width or the maximum ground clearance, determine that the obstacle is impassable; and when the obstacle is passable, determine a tilting probability of the pesticide application robot, and when an inclination angle of a body of the pesticide application robot is determined to be greater than a preset inclination angle, indicate that the pesticide application robot is prone to tilting and determine that the obstacle is impassable. In addition, the pesticide application robot has a turning width during steering, and when considering whether the pesticide application robot is capable of passing through an obstacle, a comparison between the turning width and a size of the obstacle needs to be considered.

According to embodiments of the present disclosure, the correcting the optimal path with a current location of the pesticide application robot and an area to which a pesticide has been sprayed based on the updated plan view of the target pesticide application operation area specifically includes:

performing obstacle avoidance path planning based on a relative position of the obstacle point information in the updated plan view of the target pesticide application operation area, acquiring current location information of the pesticide application robot, taking the current location information as a start point of the obstacle avoidance path planning, and setting a maximum pesticide application radius reachable point after an obstacle point in the optimal path as an end point of the obstacle avoidance path planning;

acquiring an area to which a pesticide has been applied before the obstacle point in a current path segment of the pesticide application robot in the optimal path, marking the area to which the pesticide has been applied, and determining whether an area to which the pesticide is not applied exists within the target pesticide application operation area based on the marked area;

if the area to which the pesticide is not applied exists, performing the obstacle avoidance path planning preferentially on the area to which the pesticide is not applied, and carrying out the pesticide application operation in the area to which the pesticide is not applied, and if no area to which the pesticide is not applied exists, performing the obstacle avoidance path planning according to a shortest path principle;

acquiring an overlapping area of an operation area corresponding to an obstacle avoidance path in the obstacle avoidance path planning with the marked area;

when the pesticide application robot is located in the overlapping area, stopping the pesticide application operation, and increasing a preset speed increment on the basis of an original operating speed to pass through the overlapping area; and updating the area to which the pesticide has been applied according to the obstacle avoidance path in the obstacle avoidance path planning, and correcting the optimal path based on the area to which the pesticide has been applied and a location of the pesticide application robot after obstacle avoidance.

It needs to be noted that the automatic obstacle avoidance method further includes: when a plurality of pesticide application robots are present in the target pesticide application operation area, display optimal paths and real-time location information of the plurality of pesticide application robots in the plan view of the target pesticide application operation area; determine whether collision occurs or whether pesticide application operation areas overlap according to the optimal paths based on current location information and motion speed information of the plurality of pesticide application robots; when detecting that a current pesticide application robot is to collide with a target pesticide application robot, set a waiting time of the current pesticide application robot based on size information and motion speed information of the target pesticide application robot, and cause the current pesticide application robot to wait in situ for the waiting time until the target pesticide application robot passes; if the target pesticide application robot has no certain motion trajectory, perform the obstacle avoidance path planning with a possible motion area for the target pesticide application robot at next point of time as an obstacle area, the current location of the current pesticide application robot as a planning start point, and a nearest point in the optimal path of the current pesticide application robot after the obstacle area as an obstacle avoidance end point; and when operation areas of the plurality of pesticide application robots have an overlapping area, take the overlapping area as the obstacle area for any pesticide application robot and perform secondary planning on the optimal path thereof in combination with the current location information thereof.

A third aspect of the present disclosure further provides a computer-readable storage medium, including an automatic obstacle avoidance method program of a pesticide application robot, where the automatic obstacle avoidance method program of a pesticide application robot, when executed by the processor, performs the steps of the automatic obstacle avoidance method of a pesticide application robot as described above.

In several embodiments provided in the present disclosure, it should be understood that the disclosed device and method may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the intercoupling or direct coupling or communication connection shown or discussed may be indirect coupling or communication connection through some interfaces, devices, or units; or may be implemented in electrical, mechanical, or other forms.

The units described as separate parts may or may not be physically separate. Parts displayed as units may or may not be physical units, which may be located in one position, or may be distributed on a plurality of network units. Some or all of the units may be selected according to actual needs to achieve the objectives of the solutions of the examples.

In addition, functional units in the examples of the present disclosure may be integrated into one processing module, or each of the units may exist alone physically, or two or more units are integrated into one unit. The foregoing integrated unit can be implemented either in the form of hardware or in the form of software functional units.

A person of ordinary skill in the art may understand that all or some of the steps of the method embodiments may be implemented by program instruction related hardware. The program may be stored in a computer-readable storage medium. The program, when executed, performs the steps of the method embodiments. The foregoing storage medium includes various mediums that can store program codes, such as a portable storage device, a read-only memory (ROM), a random access memory (RAM), a magnetic disk, or an optical disc.

Alternatively, if an integrated unit is implemented in the form of a software functional module and is not sold or used as an independent product, the unit may be stored in a computer-readable storage medium. Based on such understanding, the technical solution of the present disclosure, in essence, a part contributing to the prior art, or part of the technical solution may be embodied as a software product, and the computer software product is stored in a storage medium and includes a plurality of instructions for causing a computer device (which may be a personal computer, a server, or a network device) to perform all or part of the steps of the method in the embodiments of the present disclosure. The foregoing storage medium includes various mediums that can store program code, such as a portable storage device, an ROM, an RAM, a magnetic disk, or an optical disc.

The foregoing are merely descriptions of specific embodiments of the present disclosure, and the protection scope of the present disclosure is not limited thereto. Any modification or replacement easily conceived by those skilled in the art within the technical scope of the present disclosure shall fall within the protection scope of the present disclosure. Therefore, the protection scope of the present disclosure shall be subject to the protection scope of the claims.

What is claimed is:

1. An automatic obstacle avoidance method of a pesticide application robot, the automatic obstacle avoidance method comprising:

acquiring a plan view of a target pesticide application operation area and acquiring path information based on the plan view of the target pesticide application operation area;

acquiring start point information and end point information of a pesticide application robot and environmental information of the target pesticide application operation area, performing preliminary path planning based on the start point information, the end point information, and the environmental information, and acquiring an optimal path based on the preliminary path planning;

causing the pesticide application robot to arrive at a specified operating point along the optimal path, and performing environmental perception by machine vision during pesticide application operation, determining obstacle point information based on passability of the pesticide application robot, and updating the plan view of the target pesticide application operation area with the obstacle point information; and correcting the optimal path with a current location of the pesticide application robot and an area to which a pesticide has been sprayed based on the updated plan view of the target pesticide application operation area;

wherein the correcting the optimal path with a current location of the pesticide application robot and an area to which a pesticide has been sprayed based on the updated plan view of the target pesticide application operation area specifically comprises:

performing obstacle avoidance path planning based on a relative position of the obstacle point information in the updated plan view of the target pesticide application operation area, acquiring current location information of the pesticide application robot, taking the current location information as a start point of the obstacle avoidance path planning, and setting a maximum pesticide application radius reachable point after an obstacle point in the optimal path as an end point of the obstacle avoidance path planning;

acquiring an area to which a pesticide has been applied before the obstacle point in a current path segment of the pesticide application robot in the optimal path, marking the area to which the pesticide has been applied, and determining whether an area to which the pesticide is not applied exists within the target pesticide application operation area based on the marked area;

if the area to which the pesticide is not applied exists, performing the obstacle avoidance path planning preferentially on the area to which the pesticide is not applied, and carrying out the pesticide application operation in the area to which the pesticide is not applied, and if no area to which the pesticide is not applied exists, performing the obstacle avoidance path planning according to a shortest path principle;

acquiring an overlapping area of an operation area corresponding to an obstacle avoidance path in the obstacle avoidance path planning with the marked area;

when the pesticide application robot is located in the overlapping area, stopping the pesticide application operation, and increasing a preset speed increment on the basis of an original operating speed to pass through the overlapping area; and updating the area to which the pesticide has been applied according to the obstacle avoidance path in the obstacle avoidance path planning, and correcting the optimal path based on the area to which the pesticide has been applied and a location of the pesticide application robot after obstacle avoidance.

2. The automatic obstacle avoidance method according to claim 1, wherein the acquiring start point information and end point information of a pesticide application robot and environmental information of the target pesticide application operation area and performing preliminary path planning based on the start point information, the end point information, and the environmental information specifically comprises:

establishing a raster map of the target pesticide application operation area based on the plan view of the target pesticide application operation area and the environmental information, and presetting a speed constraint and a steering constraint of the pesticide application robot and a maximum safe distance of the pesticide application robot to an obstacle;

performing the preliminary path planning with a D* algorithm and constraint information based on start point information and end point information on the raster map, and setting a priority queue based on the end point information to perform backward searching in the raster map;

when an obstacle node is detected during searching, correcting path costs of neighboring raster nodes, and placing the neighboring raster nodes into the priority queue again until the current location of the pesticide application robot comes out of the priority queue; and selecting from the neighboring raster nodes a node having a minimum path cost for connection to the start point information and then performing the preliminary path planning to generate an optimal path.

3. The automatic obstacle avoidance method according to claim 1, wherein the performing environmental perception by machine vision during pesticide application operation, determining obstacle point information based on passability of the pesticide application robot, and updating the plan view of the target pesticide application operation area with the obstacle point information specifically comprises:

acquiring video image data during the pesticide application operation, preprocessing the video image data to extract a color feature and a texture feature, and performing edge segmentation on the preprocessed video image data by the color feature and the texture feature;

acquiring a binary image of the video image data by the edge segmentation, acquiring obstacle information in an ambient environment during the pesticide application operation, and acquiring contour data of an obstacle based on the binary image;

determining the passability of the pesticide application robot based on the contour data of the obstacle, size information of the pesticide application robot, and a preset safety distance; and in case of determining that the pesticide application robot fails to pass through the obstacle, performing obstacle avoidance path planning, and updating the obstacle point information in the plan view of the target pesticide application operation area.

4. The automatic obstacle avoidance method according to claim 3, wherein the determining the passability of the pesticide application robot based on the contour data of the obstacle, size information of the pesticide application robot, and a preset safety distance specifically comprises:

acquiring a size parameter of the obstacle based on the contour data of the obstacle, and comparing the size parameter of the obstacle with a maximum width or a maximum ground clearance of the pesticide application robot;

when the size parameter of the obstacle is greater than the maximum width or the maximum ground clearance, determining that the obstacle is impassable; and when the obstacle is passable, determining a tilting probability of the pesticide application robot, and when an inclination angle of a body of the pesticide application robot is determined to be greater than a preset inclination angle, indicating that the pesticide application robot is prone to tilting and determining that the obstacle is impassable.

5. The automatic obstacle avoidance method according to claim 1, further comprising:

when a plurality of pesticide application robots are present in the target pesticide application operation area, displaying optimal paths and real-time location information of the plurality of pesticide application robots in the plan view of the target pesticide application operation area;

determining whether collision occurs or whether pesticide application operation areas overlap according to the optimal paths based on current location information and motion speed information of the plurality of pesticide application robots;

when detecting that a current pesticide application robot is to collide with a target pesticide application robot, setting a waiting time of the current pesticide application robot based on size information and motion speed information of the target pesticide application robot, and causing the current pesticide application robot to wait in situ for the waiting time until the target pesticide application robot passes;

if the target pesticide application robot has no certain motion trajectory, performing the obstacle avoidance path planning with a possible motion area for the target pesticide application robot at next point of time as an obstacle area, the current location of the current pesticide application robot as a planning start point, and a nearest point in the optimal path of the current pesticide application robot after the obstacle area as an obstacle avoidance end point; and when operation areas of the plurality of pesticide application robots have an overlapping area, taking the overlapping area as the obstacle area for any pesticide application robot and performing secondary planning on the optimal path thereof in combination with the current location information thereof.

6. A non-transitory computer-readable storage medium, comprising an automatic obstacle avoidance method program of a pesticide application robot, wherein the automatic obstacle avoidance method program of a pesticide application robot, when executed by the processor, performs the steps of the automatic obstacle avoidance method of a pesticide application robot according to claim 1.

7. The non-transitory computer-readable storage medium according to claim 6, wherein the acquiring start point information and end point information of a pesticide application robot and environmental information of the target pesticide application operation area and performing preliminary path planning based on the start point information, the end point information, and the environmental information specifically comprises:

establishing a raster map of the target pesticide application operation area based on the plan view of the target pesticide application operation area and the environmental information, and presetting a speed constraint and a steering constraint of the pesticide application robot and a maximum safe distance of the pesticide application robot to an obstacle;

performing the preliminary path planning with a D* algorithm and constraint information based on start point information and end point information on the raster map, and setting a priority queue based on the end point information to perform backward searching in the raster map;

when an obstacle node is detected during searching, correcting path costs of neighboring raster nodes, and placing the neighboring raster nodes into the priority queue again until the current location of the pesticide application robot comes out of the priority queue; and selecting from the neighboring raster nodes a node having a minimum path cost for connection to the start point information and then performing the preliminary path planning to generate an optimal path.

8. The non-transitory computer-readable storage medium according to claim 6, wherein the performing environmental perception by machine vision during pesticide application operation, determining obstacle point information based on passability of the pesticide application robot, and updating the plan view of the target pesticide application operation area with the obstacle point information specifically comprises:

acquiring video image data during the pesticide application operation, preprocessing the video image data to extract a color feature and a texture feature, and performing edge segmentation on the preprocessed video image data by the color feature and the texture feature;

acquiring a binary image of the video image data by the edge segmentation, acquiring obstacle information in an ambient environment during the pesticide application operation, and acquiring contour data of an obstacle based on the binary image;

determining the passability of the pesticide application robot based on the contour data of the obstacle, size information of the pesticide application robot, and a preset safety distance; and in case of determining that the pesticide application robot fails to pass through the obstacle, performing obstacle avoidance path planning, and updating the obstacle point information in the plan view of the target pesticide application operation area.

9. The non-transitory computer-readable storage medium according to claim 8, wherein the determining the passability of the pesticide application robot based on the contour data of the obstacle, size information of the pesticide application robot, and a preset safety distance specifically comprises:

acquiring a size parameter of the obstacle based on the contour data of the obstacle, and comparing the size parameter of the obstacle with a maximum width or a maximum ground clearance of the pesticide application robot;

when the size parameter of the obstacle is greater than the maximum width or the maximum ground clearance, determining that the obstacle is impassable; and when the obstacle is passable, determining a tilting probability of the pesticide application robot, and when an inclination angle of a body of the pesticide application robot is determined to be greater than a preset inclination angle, indicating that the pesticide application robot is prone to tilting and determining that the obstacle is impassable.

10. The non-transitory computer-readable storage medium according to claim 6, further comprising:

when a plurality of pesticide application robots are present in the target pesticide application operation area, displaying optimal paths and real-time location information of the plurality of pesticide application robots in the plan view of the target pesticide application operation area;

determining whether collision occurs or whether pesticide application operation areas overlap according to the optimal paths based on current location information and motion speed information of the plurality of pesticide application robots;

when detecting that a current pesticide application robot is to collide with a target pesticide application robot, setting a waiting time of the current pesticide application robot based on size information and motion speed information of the target pesticide application robot, and causing the current pesticide application robot to wait in situ for the waiting time until the target pesticide application robot passes;

if the target pesticide application robot has no certain motion trajectory, performing the obstacle avoidance path planning with a possible motion area for the target pesticide application robot at next point of time as an obstacle area, the current location of the current pesticide application robot as a planning start point, and a nearest point in the optimal path of the current pesticide application robot after the obstacle area as an obstacle avoidance end point; and when operation areas of the plurality of pesticide application robots have an overlapping area, taking the overlapping area as the obstacle area for any pesticide application robot and performing secondary planning on the optimal path thereof in combination with the current location information thereof.

11. An automatic obstacle avoidance system of a pesticide application robot, the automatic obstacle avoidance system comprising:

a memory and a processor, wherein the memory comprises an automatic obstacle avoidance method program of a pesticide application robot, and the automatic obstacle avoidance method program of a pesticide application robot, when executed by the processor, performs the following method:

acquiring a plan view of a target pesticide application operation area and acquiring path information based on the plan view of the target pesticide application operation area;

acquiring start point information and end point information of a pesticide application robot and environmental information of the target pesticide application operation area, performing preliminary path planning based on the start point information, the end point information, and the environmental information, and acquiring an optimal path based on the preliminary path planning;

causing the pesticide application robot to arrive at a specified operating point along the optimal path, and performing environmental perception by machine vision during pesticide application operation, determining obstacle point information based on passability of the pesticide application robot, and updating the plan view of the target pesticide application operation area with the obstacle point information; and correcting the optimal path with a current location of the pesticide application robot and an area to which a pesticide has been sprayed based on the updated plan view of the target pesticide application operation area;

wherein the correcting the optimal path with a current location of the pesticide application robot and an area to which a pesticide has been sprayed based on the updated plan view of the target pesticide application operation area specifically comprises:

performing obstacle avoidance path planning based on a relative position of the obstacle point information in the updated plan view of the target pesticide application operation area, acquiring current location information of the pesticide application robot, taking the current location information as a start point of the obstacle avoidance path planning, and setting a maximum pesticide application radius reachable point after an obstacle point in the optimal path as an end point of the obstacle avoidance path planning;

acquiring an area to which a pesticide has been applied before the obstacle point in a current path segment of the pesticide application robot in the optimal path, marking the area to which the pesticide has been applied, and determining whether an area to which the pesticide is not applied exists within the target pesticide application operation area based on the marked area;

if the area to which the pesticide is not applied exists, performing the obstacle avoidance path planning preferentially on the area to which the pesticide is not applied, and carrying out the pesticide application operation in the area to which the pesticide is not applied, and if no area to which the pesticide is not applied exists, performing the obstacle avoidance path planning according to a shortest path principle;

acquiring an overlapping area of an operation area corresponding to an obstacle avoidance path in the obstacle avoidance path planning with the marked area;

when the pesticide application robot is located in the overlapping area, stopping the pesticide application operation, and increasing a preset speed increment on the basis of an original operating speed to pass through the overlapping area; and updating the area to which the pesticide has been applied according to the obstacle avoidance path in the obstacle avoidance path planning, and correcting the optimal path based on the area to which the pesticide has been applied and a location of the pesticide application robot after obstacle avoidance.

12. The automatic obstacle avoidance system according to claim 11, wherein the acquiring start point information and end point information of a pesticide application robot and environmental information of the target pesticide application operation area and performing preliminary path planning based on the start point information, the end point information, and the environmental information specifically comprises:

establishing a raster map of the target pesticide application operation area based on the plan view of the target pesticide application operation area and the environmental information, and presetting a speed constraint and a steering constraint of the pesticide application robot and a maximum safe distance of the pesticide application robot to an obstacle;

performing the preliminary path planning with a D* algorithm and constraint information based on start point information and end point information on the raster map, and setting a priority queue based on the end point information to perform backward searching in the raster map;

when an obstacle node is detected during searching, correcting path costs of neighboring raster nodes, and placing the neighboring raster nodes into the priority queue again until the current location of the pesticide application robot comes out of the priority queue; and selecting from the neighboring raster nodes a node having a minimum path cost for connection to the start point information and then performing the preliminary path planning to generate an optimal path.

* * * * *